Dec. 10, 1963     C. E. MEESE ETAL     3,113,597
METHOD AND APPARATUS FOR HOSE CLAMP
Original Filed Aug. 20, 1959
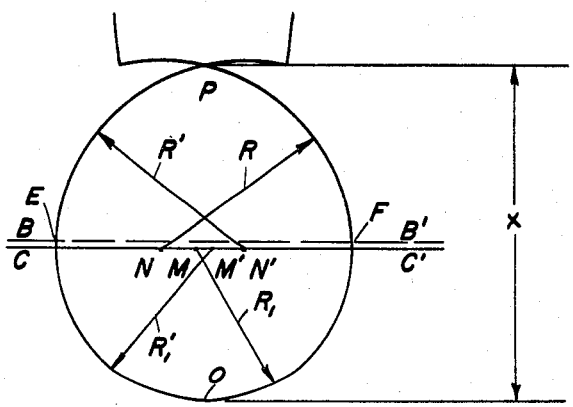
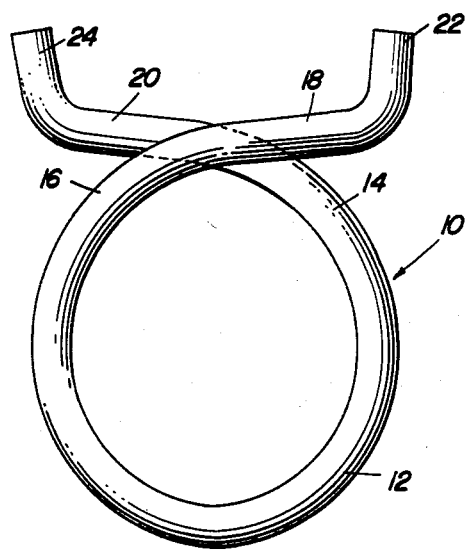
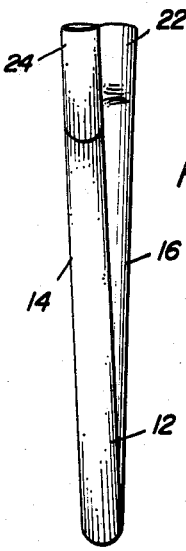
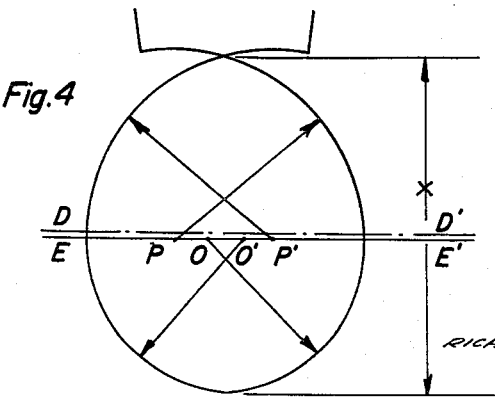
INVENTORS
CLARENCE E. MEESE,
& RONALD R. MEESE
BY
RICHEY, McNENNY & FARRINGTON
ATTORNEYS United States Patent Office 3,113,597
Patented Dec. 10, 1963

3,113,597
METHOD AND APPARATUS FOR HOSE CLAMP
Clarence E. Meese and Ronald R. Meese, New Philadelphia, Ohio, assignors of twelve and one-half percent to Naomi M. Streb, and twelve and one-half percent to Joseph M. Streb, Dover, Ohio
Original application Aug. 20, 1959, Ser. No. 835,014, now Patent No. 3,008,206, dated Nov. 14, 1961. Divided and this application Nov. 13, 1961, Ser. No. 151,965
3 Claims. (Cl. 140—88)

The present invention generally relates to a hose clamp and more particularly to a novel structural arrangement in a self-tightening or self-contracting spring wire hose clamp and is primarily concerned with certain improvements over that type of device shown in Patent No. 2,793,414 granted May 28, 1957.

The instant application is a division of our co-pending application Serial No. 835,014, filed August 20, 1959 for "Hose Clamp," now Patent No. 3,008,206.

It is the general object of the present invention to provide a self-tightening or self-contracting spring wire-type hose clamp in which the upper and lower sections of the clamp are formed about radii having a center disposed below the true center of the clamp.

The present invention incorporates a construction in which the lower section of the hose clamp is formed about two radii disposed on spaced centers in a horizontal plane below the center plane whereby the clamping force exerted by the clamp may be controlled without changing the over-all diameter of the clamp by virtue of changing the orientation of the side portions of the clamp.

A further feature of the present invention is the formation of the clamp in a manner described hereinafter so that the die forming the clamp is actually elliptical or out of round so that when the hose clamp is removed from the die and "snaps back" as will occur with this type of material, the lower half of the hose clamp will be semi-circular with the upper half still formed on two radii having a center below the center plane.

Another feature of the present invention is to provide a hose clamp which is extremely simple in construction, easy to install, adjustable as to its clamping force and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a showing of a die and a diagrammatic view of the hose clamp on the die illustrating the manner in which the hose clamp of the present invention is formed;

FIG. 2 is a side elevational view of a hose clamp constructed in accordance with the present invention in fully contracted position;

FIG. 3 is an end elevational view of the construction of FIG. 2; and

FIG. 4 is a showing of a die and a diagrammatic view of the hose clamp on the die showing an arrangement in which the sides have been drawn in slightly.

As is set forth in the previously mentioned Arras Patent No. 2,793,414, hose clamps of this nature are formed of wire stock and in application of the clamp, it is expanded and placed around the hose and released so that its inherent spring force will contract the clamp upon the hose to secure the same to a rigid tube, pipe or the like.

In order to have a successful clamp, it is desirable to have the clamp apply substantially uniform force around the circle of predetermined diameter. Further, it is desirable that the force applied by the clamp can be varied for a given predetermined diameter by varying certain characteristics of the clamp thereby enabling the clamp to be used with relatively high pressures.

The hose clamp as shown in FIGS. 2 and 3 includes a length of wire which is generally designated by numeral 10 which has substantially a circular cross-section and which may be said to have a lower body portion 12 and a pair of upper body portions 14 and 16 which are continuous with the lower body portion 12. The arms 14 and 16 cross each other at the top of the clamp in a vertical plane which substantially intersects the band. The arms or body portions 14 and 16 have projecting ends 18 and 20 which terminate in outturned end portions 22 and 24. It is noted that the upper body portions or arms 14 and 16 extend in such a manner that the portions 18 and 20 form an acute included angle with a horizontal plane passing through the point of intersection of the arms or body portions 14 and 16 when in the relaxed state as illustrated in FIG. 2 and, of course, the included angle will increase as the outturned end portions 22 and 24 are moved towards each other by a suitable tool for applying and removing the clamp.

While it has been the object of prior patents to provide the lower body portion 12 as substantially semi-circular, this actually has not been accomplished due to a quality of the material from which the hose clamp is made. This characteristics is known as "snap back." In other words, when the clamp is formed in the die and removed therefrom, the clamp will then assume a position slightly different from the position that it was in when in the die due to the tendency of the clamp to return to its normal position because of its natural inherent resiliency.

In order to overcome this problem, the present invention incorporates an arrangement in which the die is formed in a particular manner to form the hose clamp in a particular manner. In this invention, the upper and lower body sections are formed below the true center plane of the clamp designated in FIG. 1 by the reference line B—B'. As illustrated, the upper and lower sections are formed by radii having a center on the center plane designated by reference line C—C' which is below the true center plane B—B'.

The radii of the upper sections of the body designated by R and R' have their centers on the center plane C—C' at points N and N'. The radii forming the lower body section 12 are designated by $R_1$ and $R_1'$ and have their centers at points M and M' on the center plane C—C' which is below the true center plane B—B'.

The radii are arranged so that they will blend with each other at points O and P with it being possible to change the length of the radius by drawing in the sides of the clamp without changing the distance X which has to remain constant for a predetermined diameter with the change in radii providing for control of the clamping force while yet permitting the clamp to open to the same degree without permanently distorting the clamp.

In one particular form of this invention, the center plane C—C' is dropped below the center plane B—B' a distance of fifteen thousandths of an inch to form the upper section. By forming the upper section this way, there is gained a two-to-one ratio in the upper section. By forming the lower section on the plane C—C', another two-to-one ratio in the lower section is obtained. By forming the lower sections at points M—M' and blending the points at O and P, there is gained fifteen thousandths of an inch at points E and F in making the clamp smaller without changing the distance X at any time. Thus, there is gained an actual reduction of sixty thousandths of an inch smaller total circumferential distance which accounts for the four-to-one ratio since the plane C—C' was dropped only fifteen thousandths of an inch. Thus, this provides an accurate control of the pressure exerted by the clamp for a given predetermined diameter without changing the distance X.

FIG. 4 has been included to amplify the change made by drawing in the side edges of the clamp without reducing the distance X by dropping the points of origin of the radii to a point below the true center plane of the device. Since the two side sections of the hose clamp pivots about a point generally at the bottom of the clamp when spread apart, it is necessary that the X distance remain constant for a predetermined diameter hose and pipe so that a true circle is provided when the clamp is applied with an equal pressure being applied through the circumference.

In actual tests made with devices manufactured under Golden Patent No. 2,685,719 and Arras Patent No. 2,793,414, it has been found that the formation of the hose clamp by forming it with the centers as set forth in FIGS. 1 and 4, the hose clamp results in a more effective clamping action so that greater pressures may be held with the device disclosed herein. In the Arras and Golden patents, the only way that the clamping force could be changed is by changing the resilient characteristics of the hose clamp or in other words increasing the Rockwell hardness member to a point where the hose clamp was somewhat brittle which, of course, increases the clamping force to a certain degree but also increased the occurrence of breakage and possible resultant injury due to such breakage while under tension. In this device, the "snap back" will cause the lower section of the body to be semicircular and the upper section still forms on two radii below the center plane. Due to the snap back action, it is impossible to obtain a semi-circular bottom section unless this section is formed on two separate radii. Thus, the dies for forming the hose clamp are actually elliptical and are formed in accordance with the showing in FIGS. 1 and 4 and when the hose clamp is removed from the dies, the snap back of the lower section causes the lower section to assume a semi-circular condition.

The dies of FIGS. 1 and 4 are alike in that they are both elliptical and both have a major axis of the same axial extent. The distance across the minor axis of the elliptical core in FIG. 1, however, is greater than the distance across the minor axis of the elliptical core in FIG. 4. Thus the centers O and O' for the radii forming the lower part of the die in FIG. 4 in the plane E—E' are spaced from each other a greater distance than the centers M and M' for the radii R1 and R1' in FIG. 1. Similarly the centers P—P' for the radii forming the upper sectors of the die in FIG. 4 are a greater distance from each other than the centers N—N' for the radii R—R' forming the upper portion of the elliptical die in FIG. 1. The dies of FIGS. 1 and 4 are both characterized by arcuate portions beneath the overlaps to support the clamp wire at an acute included angle. It will be noted, as shown in the drawings, that the acute included angle in the clamp in its free state, as illustrated in FIG. 2, is greater than the acute included angle provided by the die, due to the spring-back or "snap-back" characteristics of the wire as it is released from the die.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. A die for forming self-tightening hose clamps, said die having a generally elliptical core surface to form the interior of the clamp, axially spaced diverging overlap supporting surfaces at each side of the major axis of the ellipse, said diverging overlap supporting surfaces being disposed at an acute included angle to a plane which is normal to the major axis of the ellipse and tangent to the ellipse, said elliptical surface being contoured to provide two merging arcs at one side of the minor axis of the ellipse and two merging arcs at the other side of the minor axis of the ellipse and the centers for all of said merging arcs being located at the same side of the minor axis of the ellipse.

2. A die for forming self-tightening spiral wound hose clamps with overlap ends, said die having a generally elliptical core surface for shaping the interior of the clamp and diverging overlap supporting surfaces at one end of the elliptical surface for shaping the overlap ends of the clamp, each of said diverging overlap supporting surfaces being at an acute included angle to a plane tangent to the ellipse and normal to the major axis of the ellipse, said elliptical surface adjacent the diverging surface being formed of two merging arcs, each of said arcs having their centers located at that side of the minor axis remote from the diverging surfaces and at that side of the major axis remote from the arc.

3. A die according to claim 2 wherein said elliptical surface remote from the diverging overlap supporting surfaces is also formed of two merging arcs and the centers of said last-named arcs are at the same side of the minor axis as the first-named centers.

References Cited in the file of this patent

UNITED STATES PATENTS

| | | |
|---|---|---|
| 682,070 | Hart | Sept. 3, 1901 |
| 2,688,346 | England | Sept. 7, 1954 |
| 2,793,414 | Arras | May 28, 1957 |

FOREIGN PATENTS

| | | |
|---|---|---|
| 958,288 | Germany | Feb. 14, 1957 |